C. WEICHELT.
CUSHION TIRE FOR VEHICLE WHEELS.
APPLICATION FILED AUG. 31, 1909.
947,535.
Patented Jan. 25, 1910.
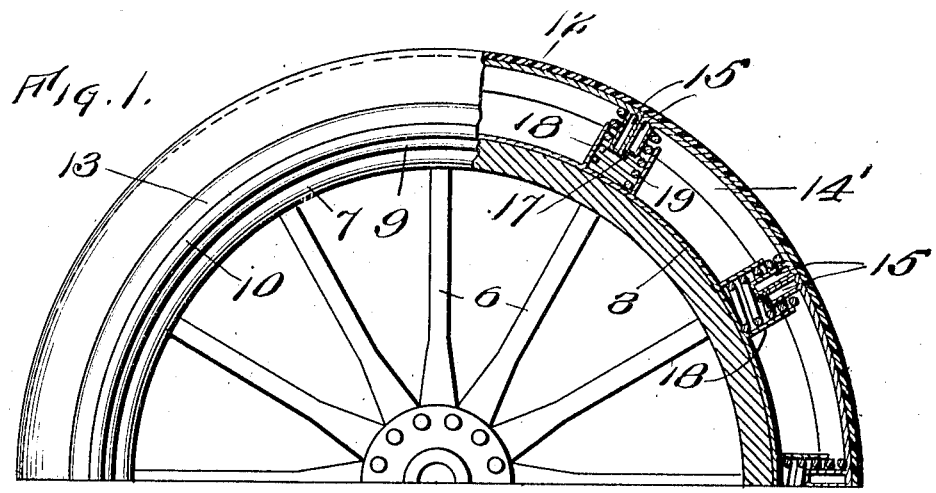
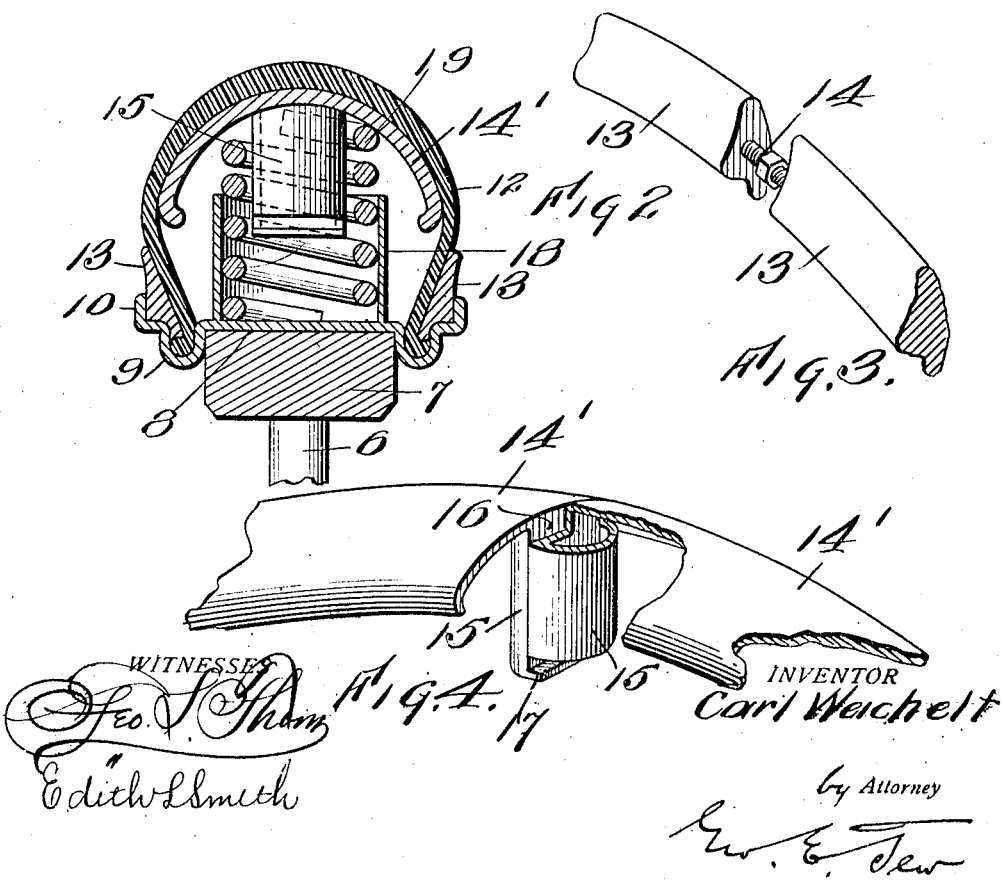
WITNESSES
Geo. S. Sham
Edith L. Smith
INVENTOR
Carl Weichelt
by Attorney

UNITED STATES PATENT OFFICE.

CARL WEICHELT, OF MARICOPA, CALIFORNIA.

CUSHION-TIRE FOR VEHICLE-WHEELS.

947,535.  Specification of Letters Patent.  Patented Jan. 25, 1910.

Application filed August 31, 1909. Serial No. 515,460.

*To all whom it may concern:*

Be it known that I, CARL WEICHELT, citizen of the United States, residing at Maricopa, in the county of Kern and State of California, have invented certain new and useful Improvements in Cushion-Tires for Vehicle-Wheels, of which the following is a specification.

This invention relates to cushion tires for vehicle wheels, of that type having internal spiral springs, and the object of the invention is to provide an improved construction with respect to the means for holding the springs in position and with respect to metallic sections or plates for connecting the springs.

A further object of the invention is to provide improvements with respect to the rubber cover for the tire, and the metal rim which holds the same in place.

The invention is illustrated in the accompanying drawings, in which:

Figure 1 is a side elevation of part of a wheel provided with the tire, part of the tire being shown in longitudinal section; Fig. 2 is a cross section; Fig. 3 is a perspective view of part of one of the clamping rings to hold the rubber cover on the tire; Fig. 4 is a perspective view in detail of part of the plates which are supported by the springs in the tire.

Referring specifically to the drawings, 6 indicates the spokes and 7 the felly of a vehicle wheel, which may be of any ordinary or suitable construction. Upon the felly is placed a steel rim 8, having a central flat or plain part, and provided at each edge with a channel 9, projecting inwardly beside the felly and serving, among other things to hold the rim on the felly, against lateral displacement. At the outer edge of each channel is an angular part 10 with an outwardly extending marginal flange, shaped to hold the clamping or clenching ring 13, which retains the tire cover in place. This ring is shaped in cross section to fit the corner at the edge of the channel, and the ring may be tightened by a right and left screw 14, or by any other suitable means. The tire cover 12 is made of rubber and its edges are shaped to fit within the channel 9 where they are clencheed by the rings 13. The tread portion of the cover is preferably thickened on the tread side, and the rim sections or plates, to be hereinafter described, rest against said thickened portion, the side edges of the plates being bent in, thereby forming a space at the edges of said sections to prevent contact thereof with the sides of the cover, which would tend to cut or crack the cover. Within the cover so placed and fastened to the rim are a series of metallic sections 14', each segmental in cross section, with a proper curvature to fit the inside of the cover. At each end each section has an inwardly projecting lug or part 15, which is semi-cylindrical in cross section, having a flat face 16 which is flush with the end of the section 14', so that when said sections are placed together, the faces 16 will contact with each other, and the projections 15 will form substantially cylindrical parts abutting against each other at the ends of adjacent sections. One projection 15 may have at its inner end an offset lip 17 forming a stop for the projection 15 of the adjacent section. The sections 14' may be made of any suitable or desired length according to the weight of the vehicle, or the desired resiliency of the tire. On the outer surface of the steel rim 8 is formed or placed a series of cups 18, which correspond in number and position to the projections 15 when assembled, and these cups form seats for the inner ends of coiled springs 19, the outer ends of which inclose or extend around the projections 15 at the ends of the metal sections 14'.

The springs 19 are in compression and serve to distend the tire. They are held in place by being set in the cups 18 at the inner ends and by extending around the projections 15 at the outer ends. The joint between the sections 14' is a loose or sliding one, the faces 16 being flat and permitting a certain amount of movement of the segmental sections 14' with respect to each other. The springs do not interfere with this movement, although they resist pressure applied to the exterior of the tire and which is communicated to the plates 14'. In addition to resisting radial compression of the tire, the springs 19 extending around the adjacent projections 15, serve to prevent excessive bend or flexion at the joints between the segmental sections 14', because the projections 15 will then tend to separate and come in contact with the encircling coils of the spring, which will accordingly resist excessive flexion inwardly at that point of the tire.

Since the springs and metal sections are not fastened together permanently, new springs can be readily substituted by loosening and lifting the cover and removing the old springs. The same convenient substitution can be made of any one or more of the segments 14'. These segments will preferably be stamped from sheet metal, the projections 15 at the ends being conveniently made of flaps bent and folded to the shape indicated, and if necessary, soldered, or otherwise fastened together.

A tire constructed as above described will have desired resiliency without the objections incident to a pneumatic tire, and the construction is much cheaper, because one or more new springs, or other parts, can be substituted whenever necessary, without renewing the whole tire.

I claim:

1. A resilient tire comprising a rim, a flexible cover attached at the edges thereto, segmental metallic sections located within the cover and having inwardly extending projections at the adjacent ends, and coiled springs between the sections and the rim and coiled around said projections.

2. A resilient tire comprising a rim having cups thereon, a flexible cover attached at its edges thereto, segmental metallic sections located within the cover and having abutting projections extending inwardly at adjacent ends, and coiled springs between the sections and the rim, one end of the springs being coiled around the respective abutting projections and the other end being located in the cups.

In testimony whereof, I affix my signature in presence of two witnesses.

CARL WEICHELT.

Witnesses:
W. M. JACKINS,
GRACE M. GARFIELD.